US011877591B2

(12) United States Patent
Zadecki et al.

(10) Patent No.: US 11,877,591 B2
(45) Date of Patent: Jan. 23, 2024

(54) DEVICE FOR TRANSFERRING ROD ARTICLES USED IN THE TOBACCO INDUSTRY

(71) Applicant: International Tobacco Machinery Poland Sp. z o. o., Radom (PL)

(72) Inventors: Robert Zadecki, Radom (PL); Leszek Sikora, Radom (PL)

(73) Assignee: International Tobacco Machinery Poland Sp. z o. o., Radom (PL)

( * ) Notice: Subject to any disclaimer, the term of this patent is extended or adjusted under 35 U.S.C. 154(b) by 518 days.

(21) Appl. No.: 17/274,452

(22) PCT Filed: Sep. 9, 2019

(86) PCT No.: PCT/IB2019/057563
§ 371 (c)(1),
(2) Date: Mar. 9, 2021

(87) PCT Pub. No.: WO2020/053730
PCT Pub. Date: Mar. 19, 2020

(65) Prior Publication Data
US 2022/0046977 A1 Feb. 17, 2022

(30) Foreign Application Priority Data
Sep. 10, 2018 (PL) .......................... 426990

(51) Int. Cl.
*A24C 5/32* (2006.01)
*B65G 29/02* (2006.01)
*B65G 47/86* (2006.01)

(52) U.S. Cl.
CPC .............. *A24C 5/326* (2013.01); *B65G 29/02* (2013.01); *B65G 47/847* (2013.01); *B65G 2201/0217* (2013.01)

(58) Field of Classification Search
CPC ...... A24C 5/326; B65G 29/02; B65G 47/847; B65G 2201/0217; B65G 43/10; B65G 47/277; B65G 47/848; B65G 2201/0226
(Continued)

(56) References Cited

U.S. PATENT DOCUMENTS 2,643,778 A * 6/1953 Socke .................... B65G 47/24
198/377.04
3,235,060 A 2/1966 Gamberini
(Continued)

OTHER PUBLICATIONS

Written Opinion in PCT/IB2019/057563 (dated Feb. 4, 2020) listing all claims as patentable.

*Primary Examiner* — Gerald McClain
(74) *Attorney, Agent, or Firm* — Oppedahl Patent Law Firm LLC

(57) ABSTRACT

A device for transferring rod articles of the tobacco industry from a longitudinal conveyor, the rod articles having an axis, the longitudinal conveyor having a first transport direction, which transports rod articles in the transport direction, along the axis of rod articles, to a transverse conveyor, the transverse conveyor having a second transport direction, which transports rod articles in the second transport direction transverse to the axis of rod articles, or inversely, containing a rotary transport device with a horizontal rotation axis, equipped with rotary arms on which brackets maintaining a horizontal position during rotation of the transport device, with grippers for gripping rod articles attached to the brackets, characterized in that the gripper is rotationally mounted on the bracket, so that the gripper's axis of rotation is directed vertically during the entire duration of the bracket's movement.

8 Claims, 5 Drawing Sheets

Figure 1:
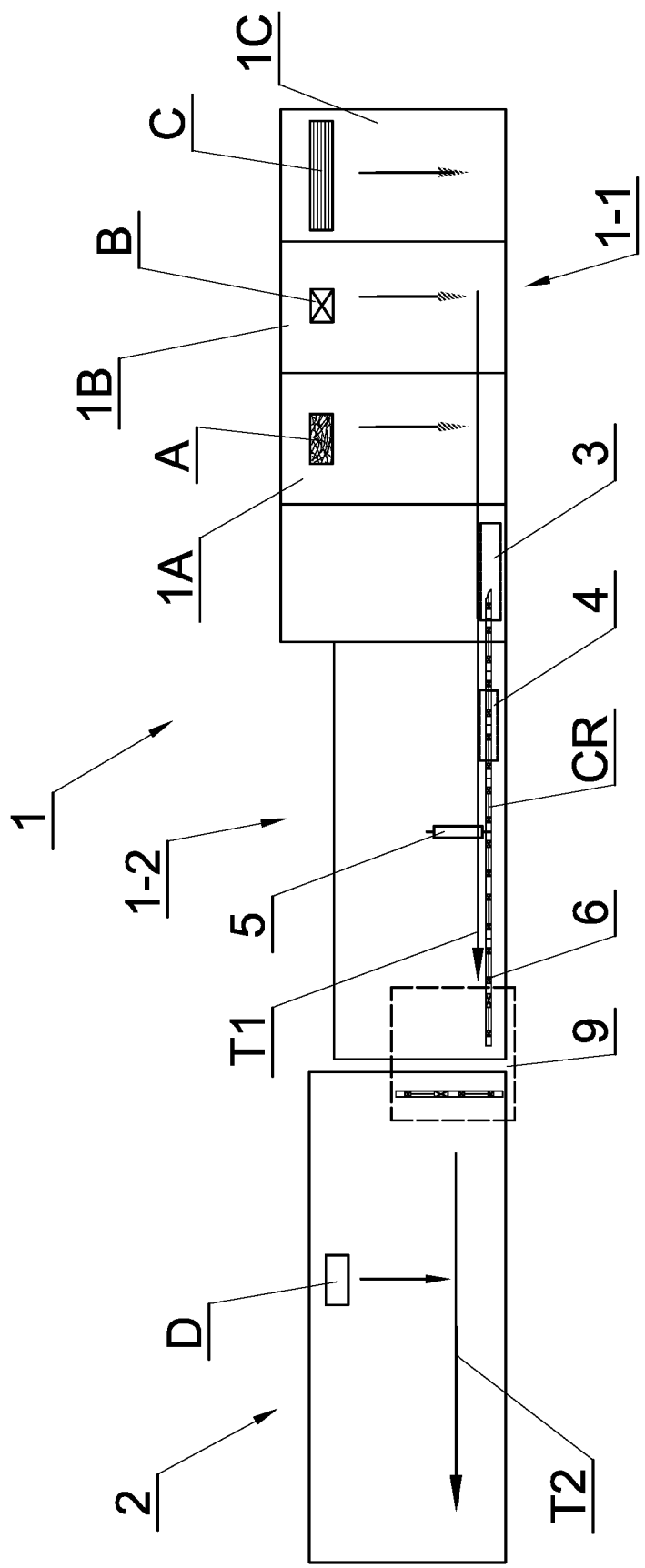

(58) Field of Classification Search
USPC ............ 198/377.01, 377.02, 377.03, 377.04
See application file for complete search history.

(56) References Cited

U.S. PATENT DOCUMENTS

| | | | |
|---|---|---|---|
| 6,247,577 B1 | 6/2001 | Dahlgruen | |
| 7,820,666 B2 * | 10/2010 | Harbeson ............ | C07D 487/04 |
| | | | 514/249 |
| 2005/0082141 A1 * | 4/2005 | Dombek ................ | A24C 5/326 |
| | | | 198/474.1 |

* cited by examiner

DEVICE FOR TRANSFERRING ROD ARTICLES USED IN THE TOBACCO INDUSTRY

The tobacco industry uses machines for producing tobacco and filter rods, with the rods being manufactured by cutting unended tobacco and filter rods moving longitudinally. Endless filter rods can be made of one or many types of filter material.

Cigarettes with a tip containing one type of filter material are made by attaching a tip containing the filter material to a tobacco rod. Usually the machine connecting the tip is fed double-length tobacco rods, i.e. two cigarettes will be produced from each tobacco rod. After the double tobacco rod is cut, a filter segment constituting the double tip is inserted between the cut tobacco parts and, after the tobacco rods and the tip are covered with tipping material, the double cigarette is cut in the middle of the double tip's length to obtain two cigarettes with a tip. Filter segments are created by cutting filter material into rods. The attached tip part can be made of one or many types of filter material.

Manufacturing of cigarettes with a tip containing several types of filter material is performed with multi-segment filter rods, in which individual segments are made of various types of filter materials. Such rods are cut into fragments that will be used as multi-segment tips. Double multi-segment tip parts containing various filter materials are placed between tobacco rods during the production process in the same manner as in the production of cigarettes with a tip from one filter material. Once the tobacco rods and the tip are covered with the cover material, the double cigarette is cut in the middle of the double tip, so that two cigarettes with a multi-segment tip are obtained.

The described method for producing cigarettes with a tip can be used to add further segments to multi-segment rods. In the production process, a double-length multi-segment rod is fed, which is cut and a double segment of the next type of filter material is placed between the single-length multi-segment rods, similarly to the above-described method for attaching the tip to tobacco parts. Wrapping and cutting is done in a similar way.

Commonly, in the process of attaching the tip part to a tobacco rod or attaching another filter segment to multi-segment filter rods, the movement direction of the rods meant to be cut changes. During the cutting of tobacco or filter rods, both the endless rod and the cut rods move longitudinally. In the process of attaching the tip or the next segment, the rods move transversely to their axes. Typically, the machine making rods and the machine attaching tips or attaching segments are positioned perpendicular in relation to each other, i.e., in the top view the movement direction of the rods on the tip attaching machine or the segment attaching machine is perpendicular to the movement direction of the rods on the rod making machine. Also, the rods on the machine attaching the tip parts or segments are oriented parallel to the rods on the rod-making machine.

Devices for transferring tobacco rods from single-track and two-track rod producing machines are known in the art. Transfer devices for single-track machines are disclosed, for example, in documents U.S. Pat. Nos. 3,567,011, 3,952,865 and 4,051,947. Transfer devices for two-track machines are disclosed, for example, in documents EP1493338 and GB2199799. The transfer devices disclosed in the above-mentioned documents allow the rod-making machine and the machine for attaching the tip to be positioned only at a right angle in relation to each other, considering the movement direction of the rods on both machines. Patent EP2997839 discloses a transfer device that allows the tip attaching machine to be situated relative to the tobacco rod making machine in a manner such that the direction of movement of the tobacco rods on the tip attaching machine in a top view is the same as on the rod making machine. Pairs of rotary grippers transferring rods from the cigarette machine to the tip attaching machine are mounted on a swinging body mounted on a rotary drum. The axes of the said rotary grippers are located radially in relation to the axis of the drum and rotate around this axis, the moved cigarette during the transfer performs a movement which is a combination of rotational movement about two axes and is, in effect, subjected to high accelerations. Such accelerations and also the excessive loads occurring during the deceleration of the cigarette can be harmful to the cigarette's content, the tobacco in particular, and in the case of such a transfer device being used for multi-segment filter rods can be harmful to the content of individual segments.

The subject of the invention is a device for transferring rod-like articles used in the tobacco industry from a longitudinal conveyor, which transports rod-like articles in the direction of transport along the axis of rod-like articles, to a transverse conveyor, which transports rod-like articles in a transverse direction in relation to the axis of the rod-like articles, or inversely, comprising a rotary transport device, with a horizontal rotation axis, equipped with rotary arms, on which brackets are mounted, which maintain a horizontal position when the transport device is rotated, with the said brackets featuring grippers for gripping rod-like articles. The device is characterized in that the gripper is mounted in a rotational system on the bracket, so that the axis of rotation of the gripper is directed vertically during the bracket's movement.

The transport direction of the rod-like articles on the longitudinal conveyor and the transport direction on the transverse conveyor in a top view can be parallel in relation to each other.

The transport direction of the rod-like articles on the longitudinal conveyor and the transport direction on the transverse conveyor can be at an angle smaller than a right angle.

The gripper's axis of rotation on the device may be halfway along the gripper's length.

The gripper's axis of rotation on the device may be at the end of the gripper.

Preferably the gripper brackets move along a circular path.

Preferably the gripper brackets move along an elliptical path.

The grippers can move in a vertical plane.

The device according to the invention allows any angular combination of the rod making machine and the machine attaching a tip to a cigarette or a machine connecting a segment to a multi-segment filter rod. In addition, accelerations to which cigarettes or filter rods are subjected during transfers are minimal.

Figure 2:
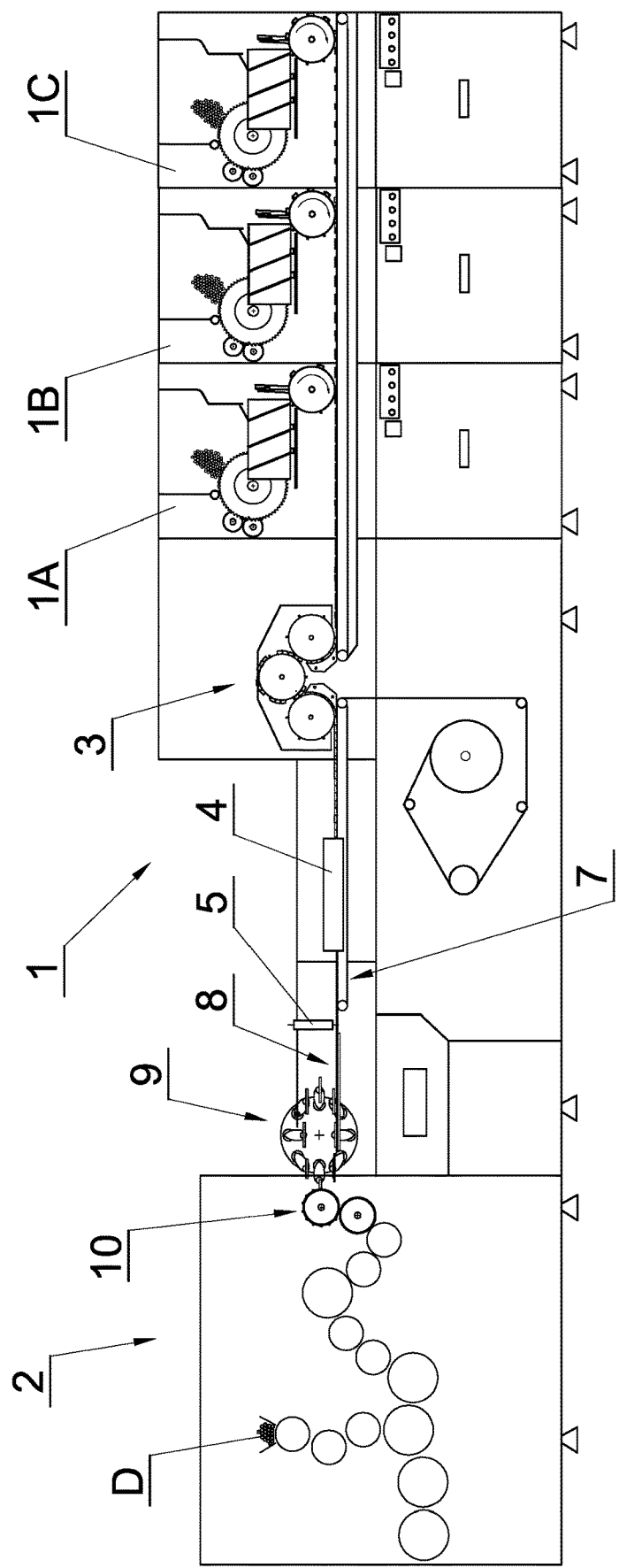
Figure 3:
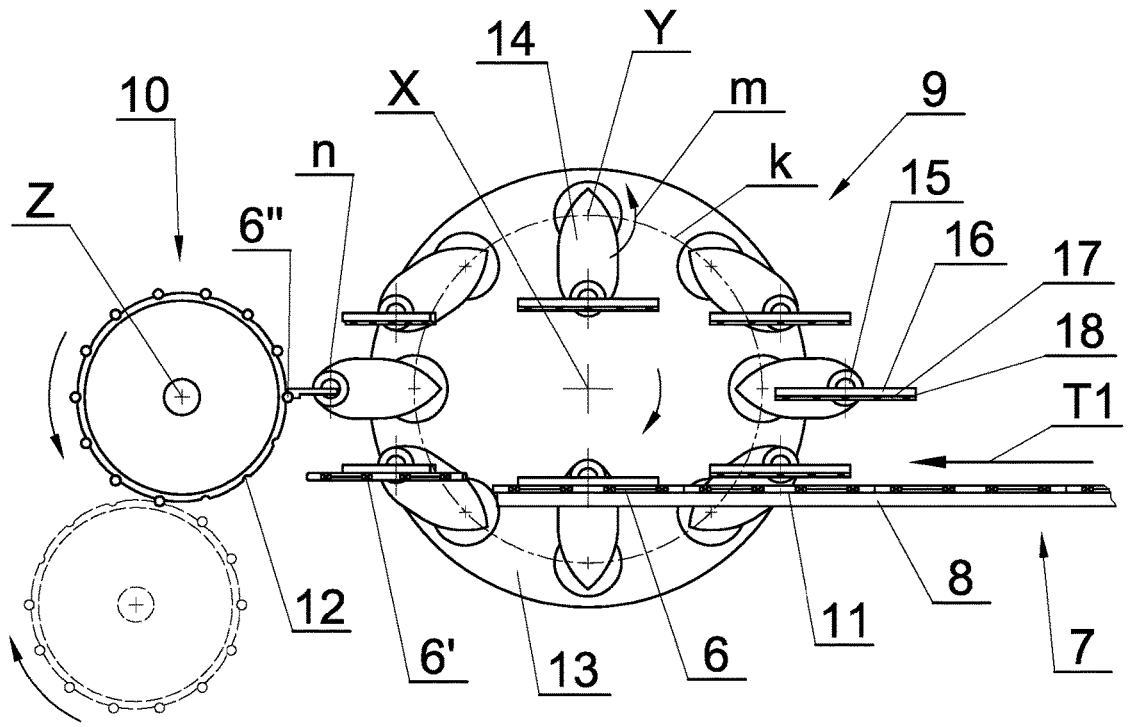
Figure 4:
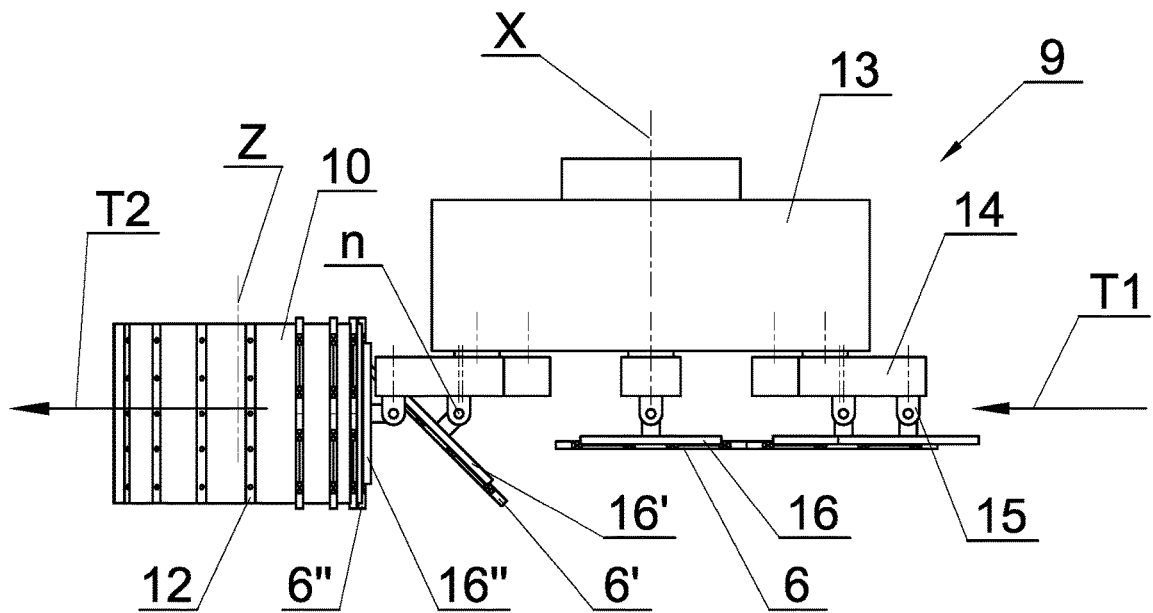
Figure 5:
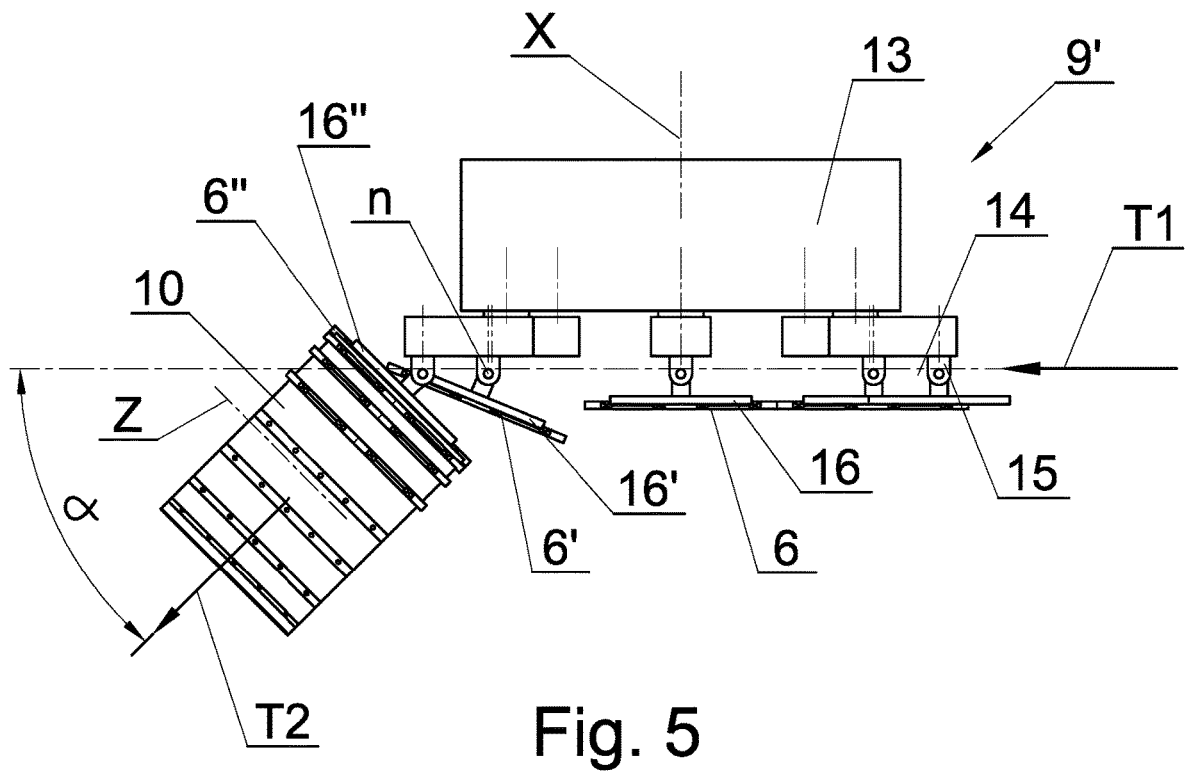
Figure 6:
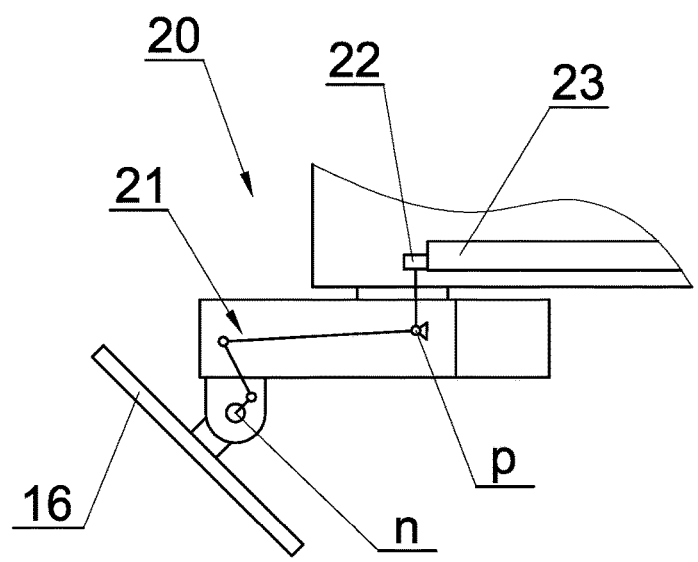
Figure 7:
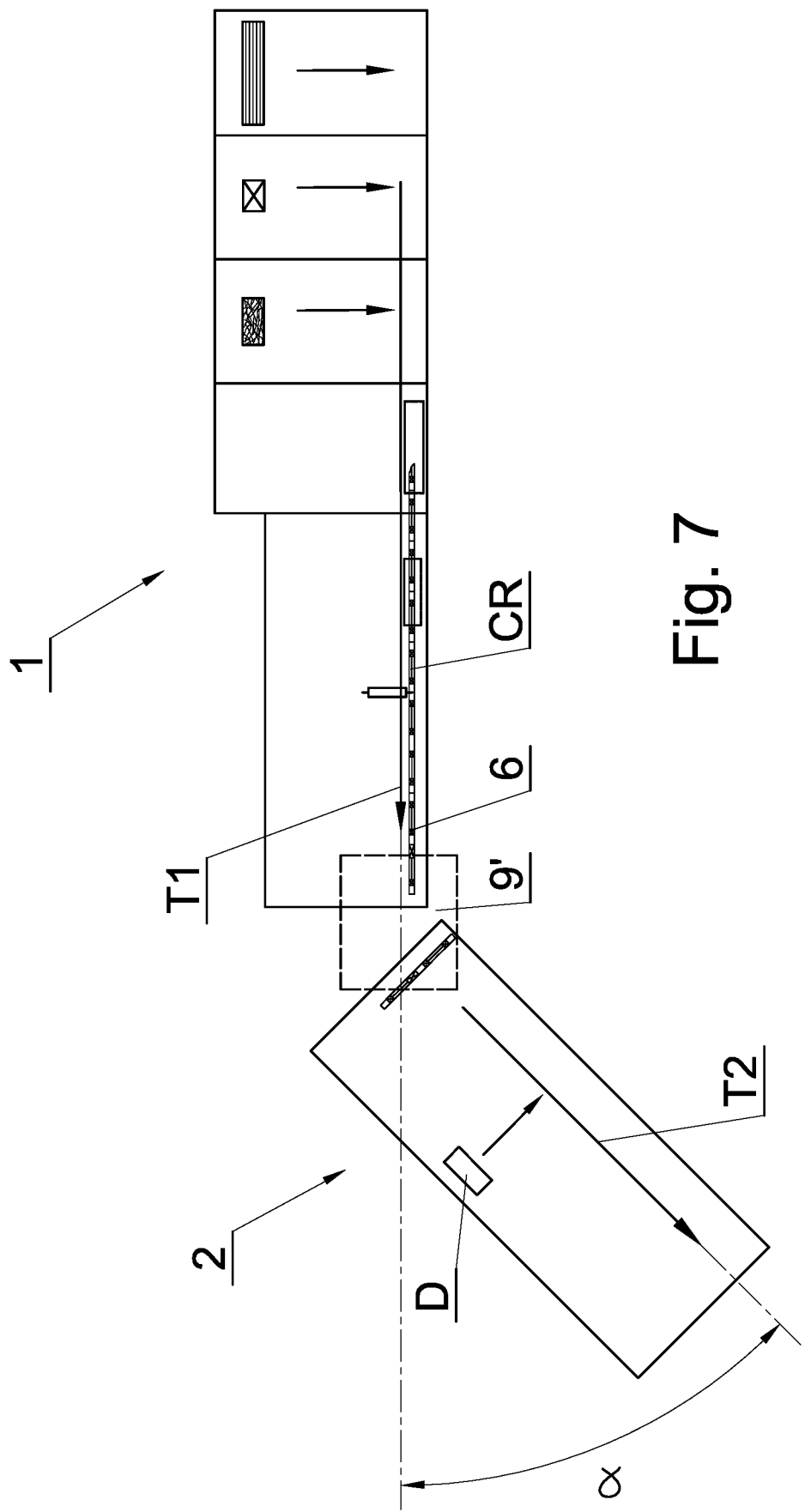

The subject of the invention is presented in more detail in the preferred embodiment shown in the drawing, in which:

FIG. 1 shows the top view of a machine for producing multi-segment rods and a machine for attaching a segment, FIG. 2 shows the machines from FIG. 1 in a front view, FIG. 3 shows the transfer device in a front view, FIG. 4 shows the transfer device and the drum conveyor of the machine for attaching segments in a top view, FIG. 5 shows the transfer device and the drum conveyor of the machine for attaching segments in an angular position in a top view, FIG. 6 shows a schematic illustration of the drive mechanism used for rotating the gripper, FIG. 7 shows a machine for producing multi-segment rods and a machine for attaching a segment in an angular position in a top view.

FIG. 1 shows the layout of the machines for producing multi-segment filter rods in a top view. The system includes machine 1 for producing multi-segment rods and machine 2 for attaching another segment to the rods produced on machine 1. Machine 1 includes a feeding part 1-1, to which filter rods of the types A, B, C are supplied, which are cut into segments A, B and C in modules 1A, 1B and 10. The supplied segments A, B, C are moved as a segment sequence, which is transferred to the forming part 1-2 by the transfer assembly 3. Segments A, B, C move in the transport direction T1 in, both, the feeding part 1-1 and the forming part 1-2. The sequence of segments A, B, C is wrapped in a covering material, for example with film or rolling paper, in the forming unit 4, with the resulting endless multi-segment rod CR moving further in the direction T1 and being cut by means of a cutting head 5 into individual multi-segment filter rods 6. Both the CR multi-segment rod and the multi-segment filter rods 6 move longitudinally in the longitudinal axial direction T1 on the linear conveyor 7 (FIG. 2), which ends with a feeding channel 8. A device 9 for transferring multi-segment rods 6 is located at the output of machine 1. During the transfer, the multi-segment rods 6 are rotated and transferred to machine 2, on which another segment D is added. The rods 6 are rotated around the vertical axis n marked in FIGS. 3 and 4, i.e. in the axis perpendicular to the plane of FIG. 1 and lying on the plane of FIG. 2, with the multi-segment rods 6 retaining their horizontal position. Once turned, the multi-segment rod 6 is placed on the drum conveyor 10, the first of many drum conveyors on the segment attaching machine 2. In machine 2, the multi-segment rods 6 move transversely to their axes on drum conveyors, which are transverse conveyors, which generally, seen from the top, move in the transport direction T2 parallel to the direction T1. Rods 6 are cut and wrapped again in the tipping material after segment D is added. The effect of work of machine 2 for attaching the next segment are rods having segments of the A, B, C and D types. Machine 1 for making multi-segment rods and machine 2 for attaching a segment can be located one behind the other since during transfer on the device 9 the multi-segment rods 6 are rotated around a vertical axis.

The device for transferring rod-like articles for the above-described machine arrangement has grippers that, when they grip the rod-like article on the machine producing rods, move tangentially in relation to the longitudinal movement of rod-like articles, in the discussed case of multi-segment rods and, when transferring the rod-like article to the machine for attaching a segment, move transversely to the axis of the rod-like article. Such a transfer device is known in the art. Mechanisms that ensure that grippers are held in a fixed horizontal position are disclosed, for example, in U.S. Pat. Nos. 3,039,606, 3,303,926, 4,408,621 and 4,465,083. The mechanisms presented there ensure that grippers move along a circular or elliptical track.

Moreover, the above documents disclose methods of supplying vacuum to the grippers. The device for transferring rod-like articles according to the invention functions based on the same principle, whereby it has a mechanism for rotating the rod-like article about a vertical axis and, while the article is being rotated, its horizontal position is maintained.

The device 9 for transferring rod-like articles 6 shown in FIG. 3 is adapted to receive rod-like articles 6 from the longitudinal conveyor 7 and move them to the transverse conveyor 10. The figure shows only the end of the longitudinal conveyor 7 in the form of a feed channel 8, for example in the form of a strip equipped with a groove 11 along which the multi-segment rods move in the direction T1. The transverse conveyor in the form of a drum conveyor 10 is provided with numerous grooves 12 on its circumference. The drum conveyor 10 has a rotation axis Z and rotates in the direction marked with the arrow. The device 9 for transferring rod-like articles includes a transport device in the form of a drum 13 with an axis of rotation X, as marked with the arrow the drum 13 rotates clockwise. Rotary arms 14 are mounted on the transport device 13, with the rotary arm 14 having a rotation axis Y, while the rotational axes Y of all rotary arms 14 are located on circle k on the drum 13. In the embodiment shown in FIG. 3 the transfer device 9 is equipped with eight grippers 16. During the rotational movement of the transport device 13 the pivot arm 14 rotates counterclockwise about the Y axis, which is indicated by the arrow m. Each pivot arm 14 at the end opposite to the Y axis of rotation has a rotationally mounted bracket 15 carrying gripper 16 with a seating surface 17 to which gripped multi-segment rods 6 abut. The multi-segment rods 6 are gripped by a vacuum and the vacuum is supplied through openings 18 in the seating surface 17. The grippers 16 maintain a horizontal position during rotation of the drum 13 along with the arms 14. Brackets 15 move along an elliptical or circular path. The gripper 16 is rotationally mounted on bracket 15, with the axis of rotation n of the gripper 16 during operation of the device 9 for transferring rod-like articles maintaining the vertical direction. In the embodiment shown, the gripper 16 rotates by 90 degrees. The axis of rotation n of gripper 16 is located in the central part of the gripper 16, with it being possible to position the axis of rotation n at the end of the gripper 16. The device 9 for transferring rod-like articles is shown in a top view in FIG. 4. Both in FIG. 3 and FIG. 4 rods 6, 6', 6" are visible in subsequent phases of transfer by the transfer device 9 to the drum conveyor 10. The rod 6, which was moving in the T1 direction, is gripped by gripper 16. The rod 6' carried by gripper 16' is in an intermediate position after rotation about vertical axis n by a specific angle, with the figure showing the position after a 45° rotation. Meanwhile, the gripper 16" and the rod 6" rod are in a position after a 90° rotation and in this position the rod 6" is transferred to groove 12 on the drum conveyor 10. The axes of rotation n of grippers 16 move in a vertical plane parallel to direction T1. The device according to the invention allows the transfer of rod-like articles in the reverse direction, i.e. from the transverse conveyor to the longitudinal conveyor, with the movements of all mechanisms being performed in directions opposite to those described above. The rotary movement of gripper 16 can be executed, for example, by means of a lever mechanism or a gear located inside the arm 14 or the transport device 13. The rotary movement of gripper 16 can be executed by means of a cam mechanism, with the cam located outside the transport drum 13 or within this drum.

FIG. 6 shows a schematic view of the cam-lever mechanism 20 for rotating the gripper 16. The mechanism 20 includes an articulated quadrilateral 21, with the arms of the quadrilateral 21 mounted on axes n and p. The motion of the articulated quadrilateral 21 is forced by roller 22 co-operating with the cam 23 inside the transport drum 13. A change in the position of the roller 22 forces rotary movement of gripper 16. The rotary motion executed this way introduces minimal accelerations that impact the transferred rod, because the rotation occurs about the axis located at the middle of the rod's length.

FIG. 5 shows the device 9' for transferring rod-like articles, which is equipped with grippers 16 adapted to rotate the rods 6 by an angle α smaller than 90°, in the embodiment shown rotated by 45°. Rods 6, 6', 6" carried by grippers 16, 16', 16" are shown in successive phases of rotation during the operation of the transfer device 9'. It must be noted that it is possible to rotate the rods 6 by any angle between 0° and 90°. Rotation by an angle exceeding 90° is possible, but not applicable in production conditions. FIG. 7 shows the multi-segment rod making machine 1 and the machine 2 for attaching a segment in a top view when used with the transfer device 9' shown in FIG. 5. As can be seen, the movement direction T2 of rod-like articles 6 on the segment attaching machine 2 is deflected from the direction T1 of movement of the rod-like articles on machine 1 for producing multi-segment rods by angle α.

The invention claimed is:

1. A device for transferring rod articles (6) of the tobacco industry from a longitudinal conveyor (7), the rod articles (6) having an axis, the longitudinal conveyor having a first transport direction (T1), which transports rod articles (6) in the transport direction (T1), along the axis of rod articles (6), to a transverse conveyor (10), the transverse conveyor (10) having a second transport direction (T2), which transports rod articles (6) in the second transport direction (T2) transverse to the axis of rod articles (6), or inversely, containing a rotary transport device (13) with a horizontal rotation axis (X), equipped with rotary arms (14) on which brackets (15) maintaining a horizontal position during rotation of the transport device (13), with grippers (16) for gripping rod articles (6) attached to the brackets (15), wherein the gripper (16) is rotationally mounted on the bracket (15), so that the gripper's (16) axis of rotation (n) is directed vertically during the entire duration of the bracket's (15) movement.

2. The device according to claim 1 wherein the first transport direction (T1) on the longitudinal conveyor (7) and the second transport direction (T2) on the transverse conveyor (10) in a top view are parallel to each other.

3. The device according to claim 1 wherein the first transport direction (T1) on the longitudinal conveyor (7) and the second transport direction (T2) on the transverse conveyor (10) are at an angle smaller than a right angle.

4. The device according to claim 1 wherein the axis of rotation (n) of the gripper (16) is located halfway along the length of the gripper (16).

5. The device according to claim 1 wherein the axis of rotation (n) of the gripper (16) is located at the end of the gripper (16).

6. The device according to claim 1 wherein the brackets (15) move along a circular path.

7. The device according to claim 1, wherein the brackets (15) move along an elliptical path.

8. The device according to claim 1 wherein the axes of rotation (n) of the grippers (16) move on a vertical plane.

* * * * *